United States Patent
Ellingsworth

(10) Patent No.: US 6,231,910 B1
(45) Date of Patent: May 15, 2001

(54) BAKING PAN FOR MULTI-TIER CAKE AND METHOD OF USING IT

(76) Inventor: Sue Ellingsworth, 1127 Lotus St., Hampton, VA (US) 23663

(*) Notice: Subject to any disclaimer, the term of this patent is extended or adjusted under 35 U.S.C. 154(b) by 0 days.

(21) Appl. No.: 09/365,815

(22) Filed: Aug. 2, 1999

(51) Int. Cl.⁷ ................................. A21D 8/00; A23P 1/00
(52) U.S. Cl. ........................ 426/505; 99/426; 99/428; 249/119; 249/DIG. 1; 426/512; 426/523
(58) Field of Search ........................ 426/505, 512, 426/523, 104; 99/426, 383, 428, 439; 249/117, 119, DIG. 1; D7/357, 610, 672, 677

(56) References Cited

U.S. PATENT DOCUMENTS 3,843,220 * 10/1974 Snider ............................. 426/104
4,931,301 * 6/1990 Giuseppe ......................... 426/505
4,941,585 7/1990 Hare et al. ....................... 220/21

OTHER PUBLICATIONS

Good Housekeeping, "Special Bakeware for Great, Old–Fashioned Cakes", Mar., 1973, p. 136.*
Wilton et al, Pictorial Encyclopedia of Modern Cake Decorating, Sixth Edition, 1969, pp. 66 and 220.*

* cited by examiner

Primary Examiner—George C. Yeung
(74) Attorney, Agent, or Firm—Blank Rome Comisky & McCauley LLP

(57) ABSTRACT

A baking pan for baking wedding cakes has the overall form of a cupcake pan, except that each baking unit has multiple tiers. In one embodiment, the baking pan has six baking units, each of which has three cylindrical tiers with steadily decreasing diameters to define the shape of a three-tier wedding cake. Thus, multi-tier wedding cakes are baked in one piece.

7 Claims, 2 Drawing Sheets

BAKING PAN FOR MULTI-TIER CAKE AND METHOD OF USING IT

BACKGROUND OF THE INVENTION

The present invention is directed to a baking pan for baking one or more multi-tier cakes and more particularly to a baking pan for baking one or more wedding cakes.

Wedding cakes are traditionally made by baking the multiple tiers separately and then joining them. That process is labor-intensive and requires accuracy to avoid giving the cake a lopsided appearance.

In another development, the wedding-cake industry is moving in the direction of smaller cakes, as shown in wedding magazines and on specialty television shows. Also, traditionally sized wedding cakes are often flanked by smaller cakes, such as the now popular grooms' cakes. Such smaller cakes have to be produced efficiently.

SUMMARY OF THE INVENTION

It will be readily apparent from the foregoing that a need exists in the art to produce wedding cakes, particularly smaller ones, efficiently and accurately. It is therefore a primary object of the invention to provide a baking pan for baking wedding cakes in one piece.

It is another object of the invention to provide a baking pan for baking multiple wedding cakes in one piece each.

It is still another object of the invention to provide a baking pan for baking small wedding cakes.

To achieve the above and other objects, the invention is directed to a baking pan in which each baking unit defines a shape of a multi-tiered wedding cake. In one embodiment, the baking pan has six such baking units and resembles a cupcake pan, and each wedding cake has three tiers.

The invention is also directed to a method of making a wedding cake by use of the baking pan just described. After the wedding cake is baked in one piece, it is glazed and decorated.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

Figure 2:
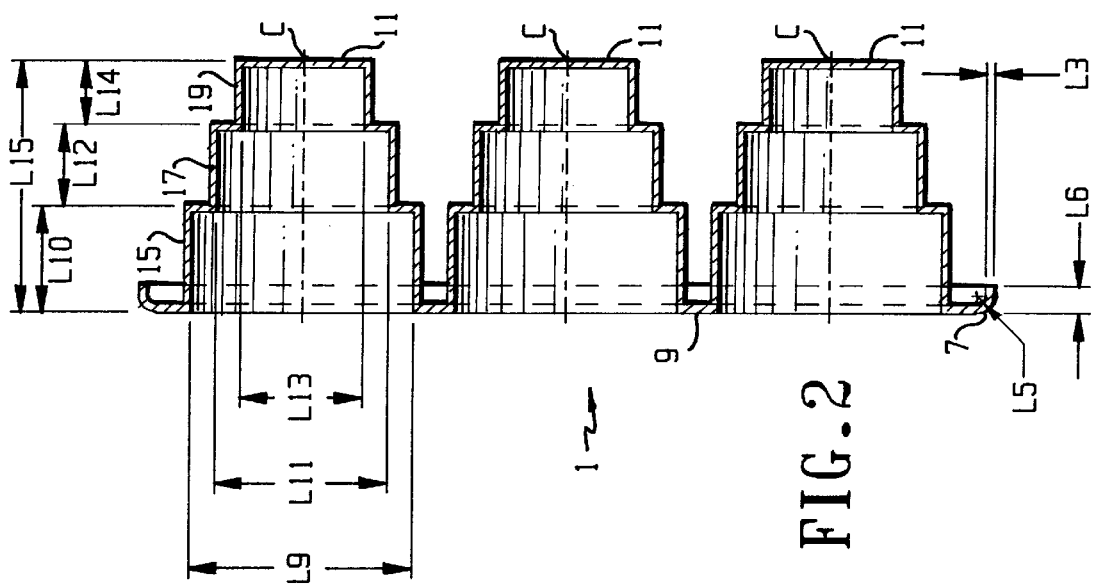
FIG. 2 shows a sectional view taken along line II—II of FIG. 1.

A preferred embodiment of the present invention will now be set forth in detail with reference to the drawings, in which like components are designated by like reference numerals throughout.

Figure 1:
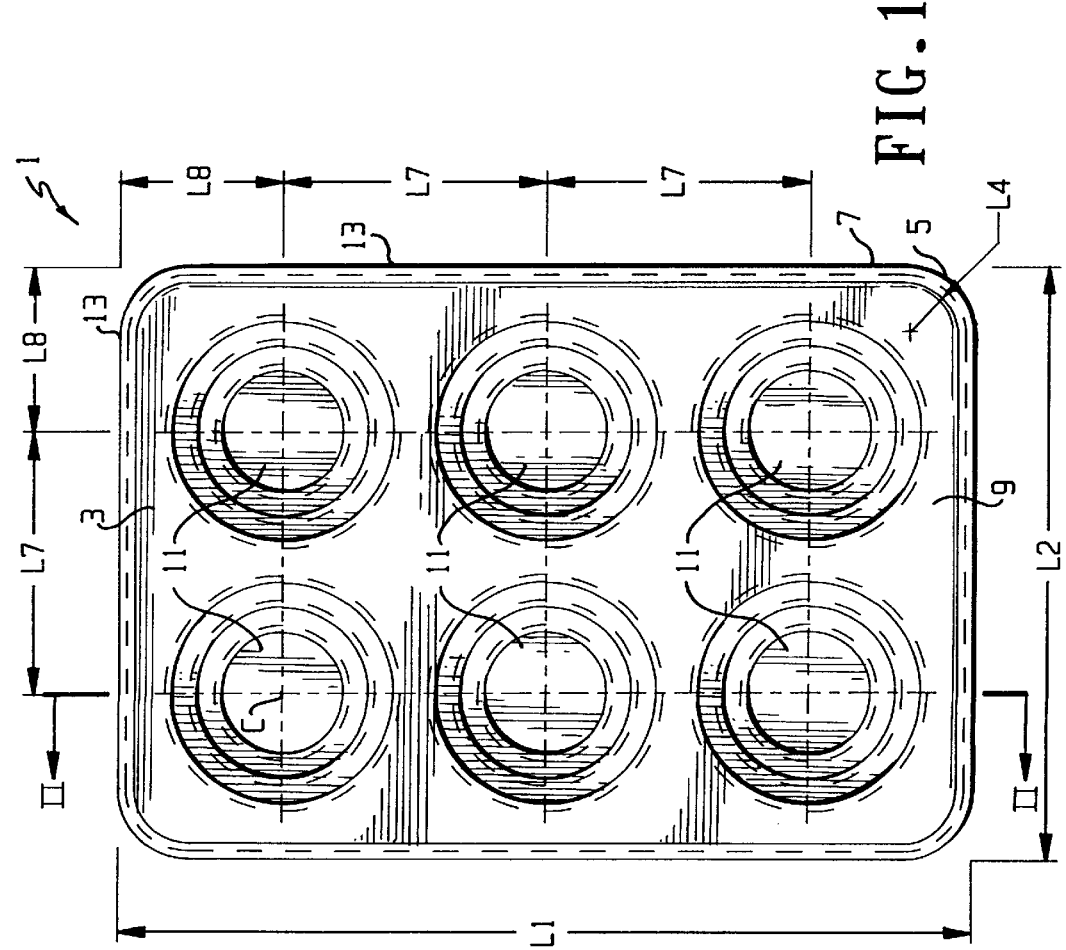
FIG. 1 shows a top view of a baking pan according to the preferred embodiment.
Figure 3:
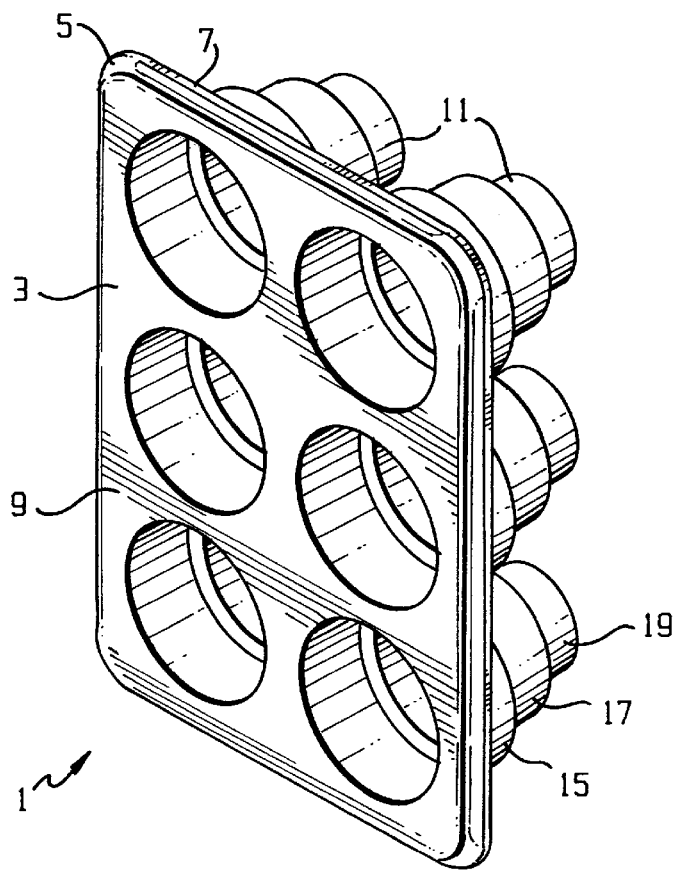
FIG. 3 shows a perspective view of the baking pan of FIG. 1.

FIGS. 1–3 show a baking pan 1 according to the preferred embodiment. The baking pan 1 can be made out of any material which will withstand the baking process (which typically involves a temperature of 400° F. for one hour) and not taint the cakes; such materials include FDA-approved plastics, metals, foils and baking papers. The finish should be suitable for the normal release of the baked cake.

The baking pan 1 includes a main body 3 having a length L1=13.0 inches and a width L2=9.0 inches and formed of a material having a thickness L3=0.1 inches. The main body 3 has four corners 5, each having a radius of curvature L4=1.0 inches, and is completely surrounded by a flange 7 having a radius of curvature L5=0.2 inches. The flange 7 extends downward by L6=0.4 inches from an upper surface 9 of the main body 3.

The baking pan 1 also includes six baking units 11. The centers C of the baking units 11 are spaced L7=4.0 inches from one another and L8=2.5 inches from the nearest edge 13 of the main body 3. Each baking unit 11 is shaped to define three tiers: a first tier 15 having an inner diameter L9=3.38 inches and a depth L10=1.5 inches; a second tier 17 having an inner diameter L11=2.63 inches and a depth L12=1.25 inches; and a third tier 19 having an inner diameter L13=1.88 inches and a depth L14=1.0 inches. The depths L10, L12, L14 of the three tiers 15, 17, 19 and the thickness L3 of the material give the baking pan 1 a total height L15=3.85 inches. It is contemplated that baking pans according to the preferred embodiment and other embodiments will have baking units with inner diameters less than four inches, although a baking pan for any other size can be made instead.

Figure 4:
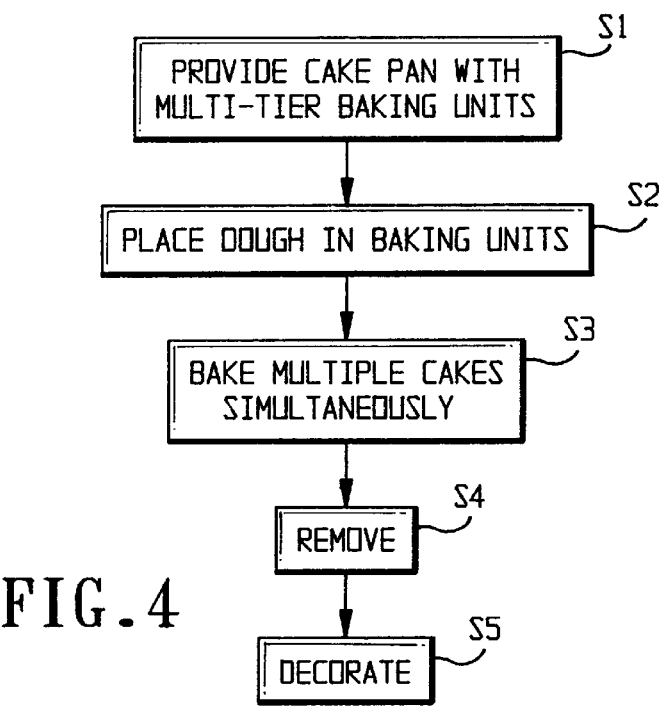
FIG. 4 shows a flow chart of the use of the baking pan of FIG. 1.

The baking pan 1 is used according to the flow chart of FIG. 4. The baking pan 1 is provided in step S1. Cake dough is introduced into each baking unit 11 in step S2 and baked in step S3 so that multiple cakes are baked simultaneously. A one-piece wedding cake is removed from each baking unit in step S4 and is glazed and decorated in step S5. Thus, the tiers of the wedding cake do not have to be assembled.

While a preferred embodiment of the present invention has been set forth in detail above, those skilled in the art who have reviewed the present disclosure will readily appreciate that other embodiments can be realized within the scope of the invention. For example, all dimensions should be considered to be illustrative rather than limiting, as the dimensions of the baking pan and particularly of the baking units can be varied to produce wedding cakes of varying sizes. Moreover, the number of tiers and the general shape can be varied. Also, the thickness of the material can be varied in accordance with the properties of that material. Furthermore, while the preferred embodiment has the general form of a cupcake tray for baking multiple wedding cakes simultaneously, the main body could be formed as a cake mold having a single baking unit. For that matter, even in a pan for baking multiple cakes, more or fewer than six units could be provided. The pan can be used as a mold for ice cream or gelatin. Therefore, the present invention should be construed as limited only by the appended claims.

I claim:

1. A baking pan for baking a multi-tiered cake in one piece, the baking pan comprising:
 a main body; and
 a plurality of baking units formed in the main body, each of said plurality of baking units defining a shape having three tiers, wherein each of the tiers is cylindrical and has a diameter, and wherein the diameters of the tiers are different from one another.

2. The baking pan of claim 1, wherein the at least one baking unit has an inner diameter less than four inches.

3. The baking pan of claim 1, wherein the main body and the at least one baking unit are formed of a material capable of withstanding a temperature of 400° F. for one hour.

4. A method of making a plurality of baked items, each having a plurality of tiers; the method comprising:

(a) providing a baking pan having a main body and a plurality of baking units formed in the main body, each of said plurality of baking units defining a shape having three tiers corresponding to the plurality of tiers of the baked item, wherein each of the tiers is cylindrical and has a diameter, and wherein the diameters of the tiers are different from one another;

(b) introducing a dough from which the baked items are to be made into the plurality of baking units;

(c) baking the dough in the plurality of baking units to make the baked items each in one piece; and (d) removing the baked items from the plurality of baking units.

5. The method of claim 4, further comprising (e) decorating the plurality of baked items for use as wedding cakes.

6. The method of claim 4 wherein each of the plurality of baking units has an inner diameter less than four inches.

7. The method of claim 4 wherein the main body and the plurality of baking units are formed of a material capable of withstanding a temperature of 400° F. for one hour.

* * * * *